United States Patent [19]

Dodson

[11] 4,306,441
[45] Dec. 22, 1981

[54] METHOD AND APPARATUS FOR MANUFACTURING AND FORMING ENGINE INDUCTION PASSAGE VENTURI

[75] Inventor: Robert W. Dodson, Royal Oak, Mich.

[73] Assignee: Colt Industries Operating Corp, New York, N.Y.

[21] Appl. No.: 93,003

[22] Filed: Nov. 9, 1979

Related U.S. Application Data

[62] Division of Ser. No. 923,214, Jul. 10, 1978, Pat. No. 4,230,645.

[51] Int. Cl.$^3$ .............................................. B21K 21/08
[52] U.S. Cl. .................................... 72/327; 29/157 C
[58] Field of Search ............... 72/327, 479; 29/157 C, 29/406, DIG. 49; 76/107 S

[56] References Cited

U.S. PATENT DOCUMENTS

| | | | |
|---|---|---|---|
| 354,412 | 12/1886 | Harrington | 72/327 |
| 1,040,497 | 10/1912 | Bosler | 72/327 |
| 2,044,697 | 6/1936 | Huss | 29/157 C |
| 2,241,735 | 5/1941 | Redsecker | 29/DIG. 49 |
| 2,618,989 | 11/1952 | Cupler | 76/107 S |
| 2,737,831 | 3/1956 | Webb | 76/107 S |
| 3,399,560 | 9/1968 | Connolly et al. | 72/377 |
| 4,081,890 | 4/1978 | Bluhm, et al. | 29/157 C |

Primary Examiner—Lowell A. Larson
Attorney, Agent, or Firm—Walter Potoroka, Sr.

[57] ABSTRACT

A carburetor is disclosed as being formed by die casting and in the process employing two opposed juxtaposed casting cores to form the induction passage and main venturi therein with the result that a flashing of die cast metal occurs as between the opposed juxtaposed cores generally transversely of the induction passage generally at the location of the throat of the venturi; after casting the carburetor, the carburetor is placed onto fixture means and a cutting and forming punch or tool is moved relative to the carburetor as to both cut through the said flashing and also seat against the metal of the upstream portion of the venturi in order to assure uniformity of contour thereof especially with respect to the venturi throat as cut and sized by the tool.

1 Claim, 5 Drawing Figures

METHOD AND APPARATUS FOR MANUFACTURING AND FORMING ENGINE INDUCTION PASSAGE VENTURI

This is a division of application Ser. No. 923,214, filed July 10, 1978, now U.S. Pat. No. 4,230,645, granted Oct. 28, 1980.

BACKGROUND OF THE INVENTION

Even though the automotive industry has over the years, if for no other reason than seeking competitive advantages, continually exerted substantial efforts to increase the fuel economy, of automotive engines, the gains continually realized thereby have been deemed by various governmental bodies as being insufficient. Further, governmental bodies have also imposed regulations specifying the maximum, and very stringent, permissable amounts of carbon monoxide (CO), hydrocarbons (HC) and oxides of nitrogen ($NO_x$) which may be emitted by the engine exhaust gases into the atmosphere.

Unfortunately, the available technology employable in attempting to attain increases in engine fuel economy is, generally, contrary to that technology employable in attempting to meet the governmentally imposed standards on exhaust emissions.

For example, the prior art, in attempting to meet the standards for $NO_x$ emissions, has employed a system of exhaust gas recirculation whereby at least a portion of the exhaust gas is re-introduced into the cylinder combustion chamber to thereby lower the combustion temperature therein and consequently reduce the formation of $NO_x$.

The prior art has also proposed the use of engine crankcase recirculation means whereby the vapors which might otherwise become vented to the atmosphere are introduced into the engine combustion chambers for burning.

The prior art has also proposed the use of fuel metering means which are effective for metering a relatively overly-rich (in terms of fuel) fuel-air mixture to the engine combustion chamber means as to thereby reduce the creation of $NO_x$ within the combustion chamber. The use of such overly-rich fuel-air mixtures results in a substantial increase in CO and HC in the engine exhaust, which, in turn, requires the supplying of additional oxygen, as by an associated air pump, to such engine exhaust in order to complete the oxidation of the CO and HC prior to its delivery into the atmosphere.

The prior art has also proposed the use of (generally relatively costly) fuel metering injection means instead of the predominantly employed carbureting means and, under superatmospheric pressure, injecting the fuel into either the primary induction passage means, the engine intake manifold or directly into the cylinders of a piston or rotor type internal combustion engine.

It is anticipated that the said governmental bodies will be establishing even more stringent exhaust emission levels of, for example, 1.0 gram/mile of $NO_x$ (or even less).

The prior art, in view of such anticipated requirements with respect to $NO_x$, has suggested the employment of a "three-way" catalyst, in a single bed, within the stream of exhaust gases as a means of attaining such anticipated exhaust emission limits. Generally, a "three-way" catalyst (as opposed to the "two way" catalyst system well known in the art) is a single catalyst, or catalyst mixture, which catalyzes the oxidation of hydrocarbons and carbon monoxide and also the reduction of oxides of nitrogen. However, it has been discovered that a difficulty with such a "three-way" catalyst system is that if the fuel metering is too rich (in terms of fuel), the $NO_x$ will be reduced effectively, however, the oxidation of CO will be incomplete. On the other hand, if the fuel metering is too lean, the CO will be effectively oxidized but the reduction of $NO_x$ will be incomplete.

It should be apparent that in each of the hereinbefore disclosed prior art proposals (only selected ones being set forth) the accurate metering of the fuel becomes extremely important to the overall attainable success of that particular proposal.

In carburetors, it is accepted practice to employ what is usually referred to as a primary or main venturi within the induction passage means. The motive fluid or air passing through such induction passage means must pass through the throat of such venturi and, in so doing, creates a reduction in the static pressure in the motive fluid in the vicinity of the throat. Generally, the static pressure varies as the square of the velocity of the motive fluid or air flow through the venturi throat. Knowing the physical size (flow area) of the venturi throat and the velocity of flow therethrough, it becomes possible to compute (for any set of given conditions) the volume rate as well as the mass rate of air flow. It then becomes a calculable solution as to what size metering restrictions etc. should be employed as to result in the delivery (by aspiration) of fuel to the induction passage (for each of such set of given conditions) while employing the generated venturi static pressure as one of the pressures in determining the fuel metering pressure.

In many forms of fuel injection systems, a motive fluid or air induction passage having a venturi therein is also employed. Often, in such arrangements, the primary purpose of such a venturi is to create a pressure signal or pressure signals (indicative of rate of flow of air through the induction passage) which are, in turn, employed by and responded to by related control means within the fuel injection system as to accordingly or in response thereto alter or control the fuel volume and/or mass rate of metered fuel flow.

It is obvious that the only way the consuming public can afford to purchase any such fuel metering system is for the manufacturer or manufacturers thereof to employ techniques of mass-production. One of such techniques adopted by (for all practical purposes) every manufacturer of carburetors and/or fuel injection systems employing a venturi induction passage is to die cast such structure which defines the induction passage and venturi. Die casting has been accepted and acknowledged as a very accurate method of repetitive manufacture of a large quantity of identical parts. In such casting, the die assemblies are usually made as to include a plurality of mold cavities thereby producing a like plurality of castings (die cast parts) for each cycle of machine operation. This is also an accepted technique to minimize the cost per-part-cast in terms of machine amortization as well as labor costs.

In situations where a plurality of mold cavities are formed, such are almost invariably formed (machined) from a single "master" so that the mold cavities are, for all practical purposes, identical to each other. Generally, the same applies to where two or more vendors supply the same die cast parts to a single vendee who will employ such cast parts in related structures or systems.

Generally, in die casting such venturi bearing induction passage structures, the die cavity defines the external configuration of the structure while suitable cores are employed for defining internal configurations. Since the induction passage and venturi are internal configurations, core means are employed for the definition thereof. Further, since the venturi throat is the smallest transverse or cross-sectional area in the cast induction passage, at least two cores are needed to enable core withdrawal after casting.

Accordingly, in the die casting of such induction passage structures with a venturi, first core means is employed to define, generally, the configuration of the induction passage and venturi upstream of the venturi throat while second core means is employed to define, generally, the configuration of the induction passage and venturi downstream of the venturi throat. As should be apparent, such first and second core means, at their respective jutting ends, are juxtaposed to each other during the actual casting operation. However, because of manufacturing techniques, directions of movement of the respective die blocks and cores (as during closing and opening movements) it becomes practically impossible to bring the juxtaposed ends of the induction passage and venturi cores against each other to form a fluid-tight passage therebetween. As a consequence thereof, a generally transversely extending portion of die cast metal results at the throat of the venturi, such commonly being referred to as flashing. Experience has shown that such flashing may be, for example, of a thickness in the order of 0.20 inch.

Heretofore, it has been accepted practice to take such cast induction passage and venturi structures and then accurately machine-out (cut out) the flashing to define the desired venturi throat area.

However, it has been unexpectedly discovered that even though every precautionary step has been believed to have be taken in order to assure uniformity of such resulting cast and venturi machined induction passage and venturi structures, when such structures are employed in an overall metering environment or system, substantial and totally unexpected variations in the ultimate fuel metering characteristics are experienced.

That is (for example, with any one particular design of an induction passage and venturi structure), even though the die cavities and cores are made from the same master, and even if the flashing is cut out of all of the cast structures with the same tool, there are unexpected variations experienced in ultimate metering as between any two systems employing respective ones of such induction passage and machined venturi throat structures. Further, such variations are also found where two or more of such induction passage structures are sequentially cast in the same die cavity and machined by the same tool for removing the flashing.

Because of such variations, the attainable accuracy of the associated total fuel metering system is limited and often becomes significantly less than that otherwise anticipated.

It has now been discovered that not only must the flashing be accurately removed from the throat of the cast venturi, but that the surface portion of the venturi, upstream of the throat, must also be re-formed, as by coining or the like, as to assure proper entry of the air (motive fluid) into and through the venturi throat. Even though the precise reasons are not known, it nevertheless appears that there are extremely slight variations, as between any two structures, in the upstream portion of the venturi. If this belief that such slight variations do exist is, in fact, correct, then it would appear that such variations might occur as a result of slight variations: (a) in the temperature of the mold or die assembly during casting, (b) in the temperature of the molten metal being cast in the die assembly, (c) in variations in the thickness of various portions of the structure defining the induction passage means and the consequent variations in time-rate of heat transference, or (d) any combination of the preceding or any other unknown factors.

Accordingly, the invention as herein disclosed and claimed is primarily directed to the solution of the aforestated as well as other related and attendant problems.

SUMMARY OF THE INVENTION

Method

According to the invention, a method of forming an induction passage-venturi structure comprises the steps of casting the structure in mold cavity means employing core means for defining the induction passage and venturi portion of the said structure, removing the cast structure from said mold cavity means, employing metal-removing tool means to remove metal flashing in the vicinity of the throat of said venturi, and mechanically re-forming at least a portion of the surface of said venturi upstream of the throat of said venturi.

Apparatus

According to the invention, apparatus for practicing the above method may comprise punch-like metal cutting means of a cutting diameter equivalent to the desired diameter of the throat of the venturi, and a metal coining portion for engaging and coining at least a portion of the surface of the venturi upstream of the throat of the venturi.

Various general and specific objects, advantages and aspects of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted from one or more views.

DETAILED DESCRIPTION OF THE PREFERRED EMBODIMENT

Figure 1:
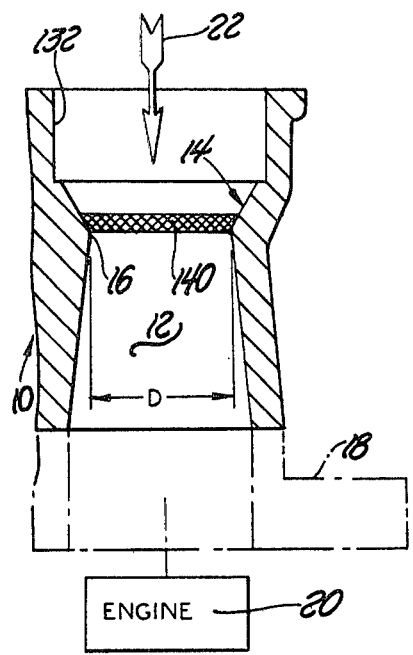
FIG. 1 is a fragmentary axial cross-sectional view, in possibly somewhat simplified form, of an induction passage structure which may be a portion of, for example, an overall carburetor structure.

Referring now in greater to the drawings, FIG. 1 depicts in axial cross-section an induction passage structure 10 having induction passage means 12 formed therethrough with a venturi 14 formed therein. The structure 10 may be employable as a portion of an overall fuel injection system wherein the rate of metered air flow through the induction passage 12 is measured or sensed as by appropriate sensing means (not shown but well known in the art) situated as in the vicinity of the throat 16 of venturi 14. Likewise, structure 10 may comprise carbureting means and, as is often the case, and as is well known in the art, may be associated as with related throttle body means, partially illustrated in phantom line at 18, and air horn or air intake means (not shown but well known in the art). If the structure 10 did in fact comprise a carburetor, there could be other portions included or includable therein as, for example, fuel discharge nozzle means which, often, are assembled thereto after the structure 10 is cast and otherwise completed. In any event, for purposes of reference and disclosure, it is assumed that the motive fluid inlet is uppermost (as viewed in FIG. 1) and the direction of flow to the related engine 20 is downwardly in the direction indicated by arrow 22. Further, for purposes of reference, let it be assumed that the induction passage 12 and venturi 14 are finished or completed as such relate to this invention thereby resulting in the throat 16 of venturi having, for example, a diameter, D.

Figure 2:
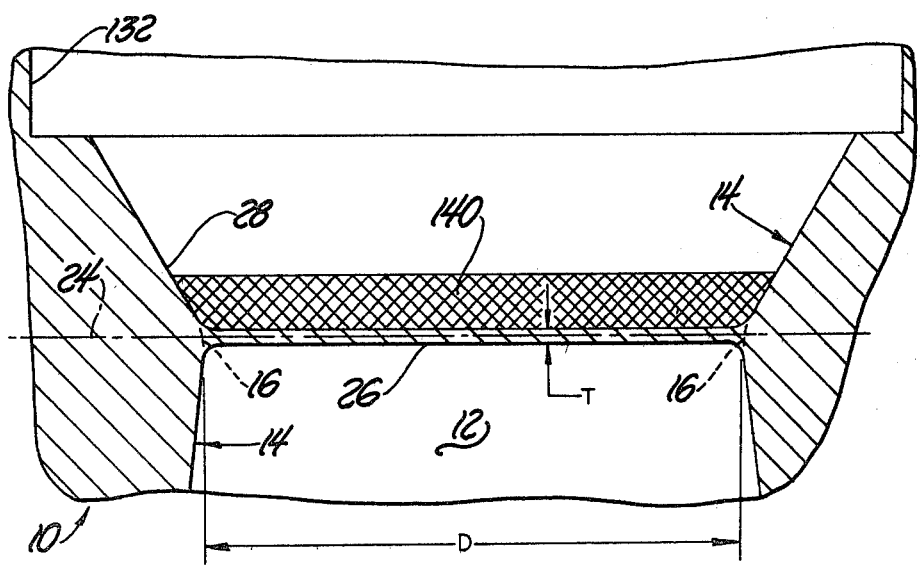
FIG. 2 is a relatively enlarged fragmentary portion of the structure of FIG. 1 illustrating what that portion of such structure may look like immediately after being cast as, for example, by die casting.

FIG. 2 depicts what the portion of the venturi 14 may look like immediately after it is formed by casting. That is, because the two internal cores hereinbefore referred to would not quite meet each other at the assumed parting line or plane depicted at 24, there would result, as a consequence thereof, a leakage of molten metal which, upon solidifying, would define a generally transversely extending flashing portion 26. The flashing may or may not be solid across the entire throat area and may have any thickness. In some instances such flashing 26 has been found to have a cross-sectional thickness (as depicted at T of FIG. 2) of 0.015 to 0.020 inch. As generally indicated in hidden line at 16 and by the dimension, D, the throat diameter or opening must be formed through such flashing 26.

Figure 3:
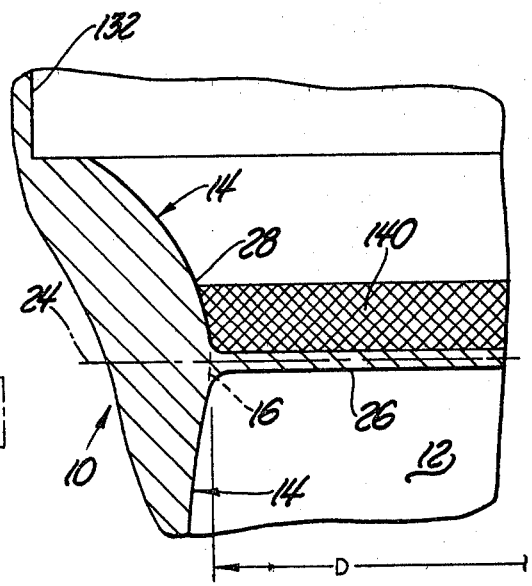
FIG. 3 is a view similar to a fragmentary portion of the structure of FIG. 2 but illustrating, by way of example, a variation thereof.

FIG. 3 merely illustrated, by way of example, a variation in the surface of the venturi upstream of the venturi throat 16. All elements in FIG. 3 which are like or similar to those of FIG. 2 are identified with like reference numbers. In comparing FIGS. 2 and 3 it will be noted that the said upstream surface 28 in FIG. 2 is generally a straight conical or straight taper funnel-like configuration while the equivalent upstream surface 28 in FIG. 3 is of a generally curvilinear taper funnel-like configuration.

Figure 4:
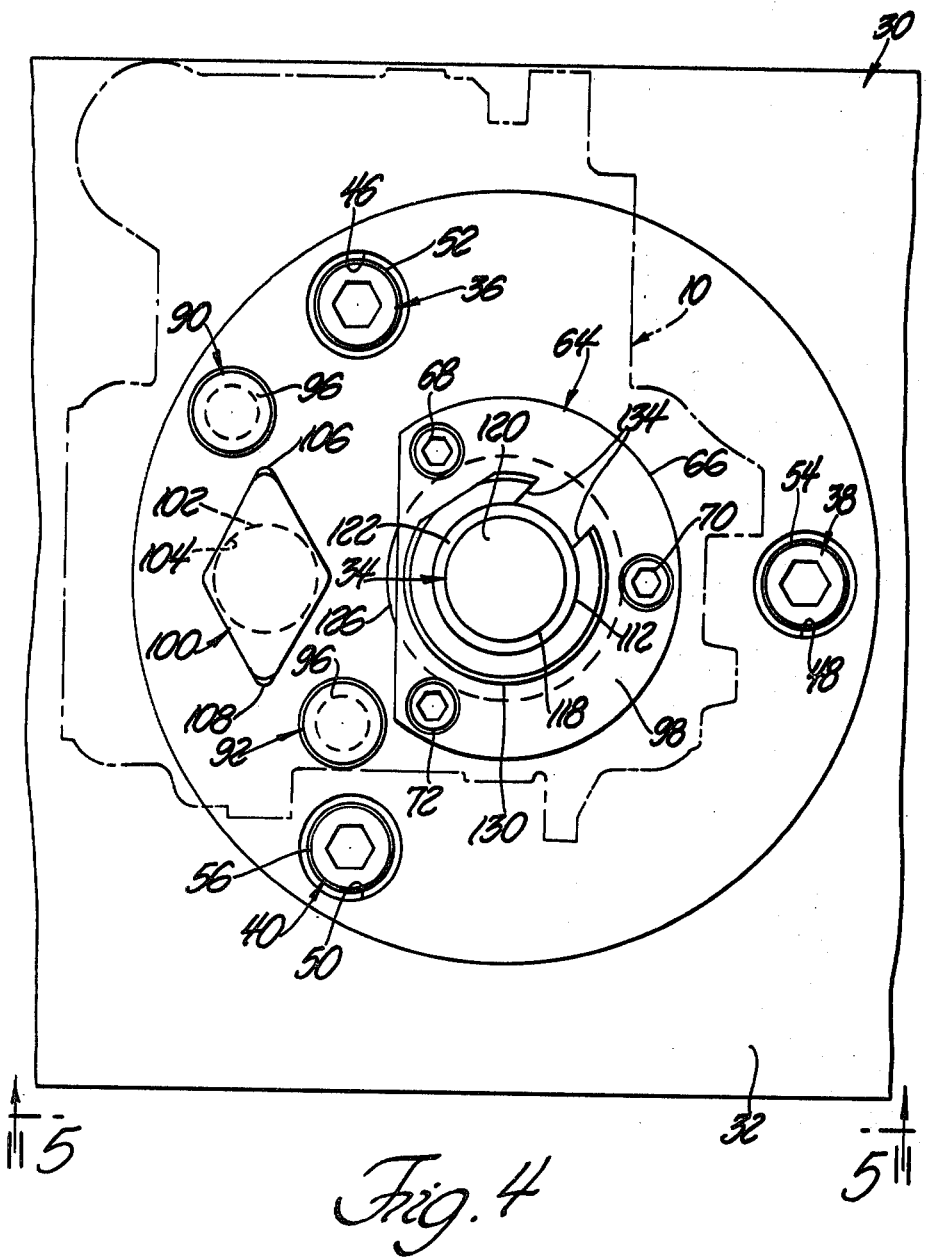
FIG. 4 is a top plan view of apparatus employing teachings of the invention and effective for carrying out the inventive method.
Figure 5:
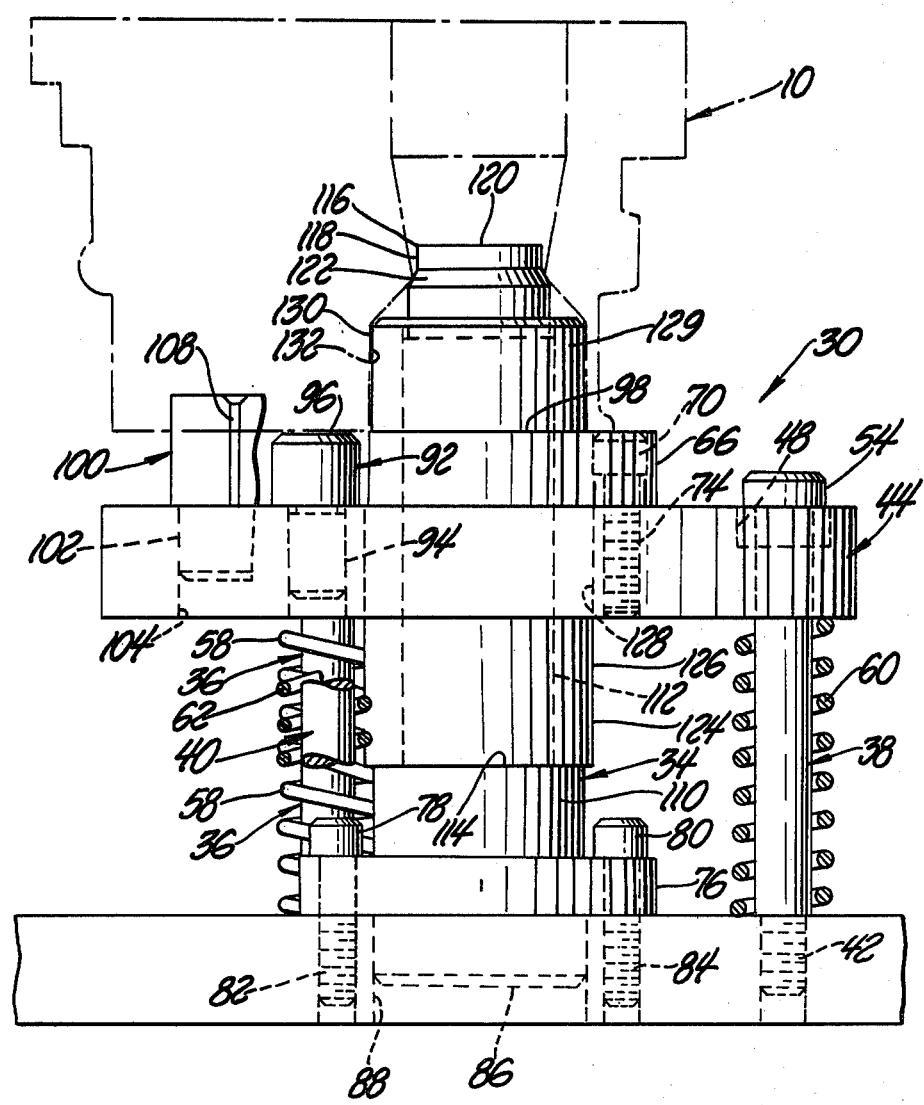
FIG. 5 is a side elevational view of the apparatus of FIG. 4 taken generally on the plane of line 5—5 of FIG. 4 and looking in the direction of the arrows and with certain portions thereof broken away and omitted.

Referring to FIGS. 4 and 5, the apparatus 30, for, in effect, transforming the structure fragmentarily illustrated in FIG. 2 to the assumed finished or completed structure of FIG. 1, is illustrated as comprising a base 32 which supports generally upwardly extending tool means 34 and a plurality of socket head screws 36, 38 and 40 which are respectively threadably engaged, as typically illustrated at 42, at their respective lower ends with base or support 32.

A movable plate 44 slidably receives the shank portions of the screws 36, 38 and 40 and, preferably, is provided with a plurality of counter-sunk portions 46, 48 and 50 for respectively receiving the respective heads 52, 54 and 56 of screws 36, 38 and 40. Further, a plurality of compression springs 58, 60 and 62 respectively situated about the shank portions of screws 36, 38 and 40 are axially confined between support 32 and upper movable support or plate 44.

A bushing-like locator means 64 is secured to plate 44 as through an integrally formed flange portion 66 and a plurality of screws 68, 70 and 72 each threadably engaged with plate 44 as typically illustrated at 74. The bushing or locator means 64 is slidably received on and about tool means 34 which as through an integrally formed flange 76 and a plurality of screws, two of which are shown at 78 and 80, is secured to base 32 as by threadable engagement therewith by screws 78 and 80 typically illustrated at 82 and 84. A preferably integrally formed pilot portion 86 of tool means 34 is closely received within a receiving aperture or passage 88 in base 32.

A plurality of rest buttons or surface locators or supports 90 and 92 have shank portions of reduced diameter, as typically illustrated at 94, which are preferably press-fitted into receiving openings formed in upper support 44. In the embodiment shown, the upper surfaces 96 of each of the rest or support members 90 and 92 are preferably co-planar with upper surface 98 of flange 66.

Further, in the embodiment disclosed, a generally diamond-shaped lateral-type locator 100 is also carried by the upper support plate 44 and suitably secured thereto as by a shank portion 102 press-fitted into a cooperating aperture 104 in plate 44. As best seen in FIG. 4, the locator means 100 has generally opposed locating surfaces 106 and 108 which are effective for operatively engaging juxtaposed surface portions of the induction passage structure 10 as to, if need be, permit the placement of the structure 10 onto the apparatus 30 in only a predetermined relationship.

More specifically, in the preferred embodiment, tool means 64 comprises a relatively enlarged lower disposed cylindrical body portion 110 and an upwardly extending body portion 112 of relatively reduced diameter with an annular shoulder 114 at the transition. The upper-most portion of tool means and body portion 112 is provided as with a sharp circular cutting edge 116 defined as by the intersection of the outer generally cylindrical surface portion 118 and end surface portion 120. Axially spaced from the end surface 120 is a generally conical surface segment 122. The exact configuration of such surface 122 may be any as is desired; however, in one particularly successful embodiment the surface 122 was of a straight taper and inclined as to define an included angle in the order of 56°.

Further, still more specifically, in the preferred embodiment, the bushing means 64 comprises a generally tubular body 124 having an internal passage 126 closely slidably receiving the body portion 112 of tool means 34. Tubular body 124 has a first axially extending outer cylindrical surface 126 of relatively enlarged diameter which is closely received within a cooperating aperture or passage 128 in upper support means 44. The upper portion 129 of tubular body 124 has an axially extending outer generally cylindrical surface 130 of relatively reduced diameter which is closely received as within the upstream portion or surface 132 of the induction passage means 12 (also see FIGS. 1, 2 and 3). As seen in FIGS. 4 and 5, certain portions of the various elements may be removed or cut away as to, where required, provide clearance for what would otherwise be obstructions. For example, in certain induction passage structures, integrally formed bosses, risers or the like may be cast at the time of casting the induction passage structure. Accordingly, as generally depicted at 134, of FIG. 4, a cut-out or relieved portion may be formed as in the upper portion 129 of tubular body 124 in order to accommodate such an, assumed, otherwise obstruction.

OPERATION OF APPARATUS OF FIGS. 4 AND 5

When the apparatus 30 is in its normal state, upper support plate 44 is in its upper-most position as would be determined, for example, by the lower surfaces of the screw or bolt heads 52, 54, and 56 axially abutting against the axial end surfaces of respective counterbores 46, 48 and 50 with the support plate 44 being resiliently urged to such upper-most position by spring means 58, 60 and 62. The bushing or locator member 64, being secured to and carried by the upper plate or support 44 will also have moved upwardly a like distance from that shown in FIG. 5, thereby bring the upper end of tubular body portion 129 to an elevation closer to that of end 120 of tool means 34.

With the apparatus 30 thusly in its normal condition, a cast induction passage structure 10, as possibly a carburetor generally depicted in phantom line in FIGS. 4 and 5, is placed generally atop the apparatus 30. At this time the flashing 26 is still in the induction passage structure as at the throat of the venturi 14 (see FIGS. 2 and 3). The induction passage structure 10 is placed onto apparatus 30 in a manner as to have the air or fluid inlet end thereof directed downwardly, as viewed in FIG. 5, and as to have the inlet passage surface 132 closely receiving and piloting about upper bushing or locator portion outer surface 130. As depicted, the thusly positioned lower end of induction passage structure 10 may rest against upper surface 98 of flange portion 66 and the remaining generally cantilevered portion (if there is such) of the induction passage structure 10, generally illustratively depicted at the upper left side of FIG. 5, may be suitably supported as by the upper surfaces of related rests or supports 90 and 92. Also, induction passage structure 10 may be angularly adjusted (as viewed in FIG. 4) as to engage, if need be, related gauging or reference surface means with suitable locating means as at 100.

After the induction passage structure 10 is thusly properly positioned atop apparatus 30, the induction passage structure 10, upper support 44 and bushing locator means 64 are moved axially, downwardly, relative to tool means 34. Such relative motion continues causing the sharp cutting edge 116 of tool means 34 to cut through the flashing 26 thereby forming and defining the venturi throat 16 diameter, D, as depicted in FIGS. 2, 3 and 1. Also, upon sufficient continued relative movement of induction passage structure 10 and plate 44, the tapered or contoured surface 122 of tool means 34 strikes against a portion of the surface 28 of the venturi 14 upstream of the now open and defined throat 16 as to coin such surface portion to remove any irregularities therefrom. Even though it is easily possible to achieve such coining with one strike of the tool means surface 122, it is, nevertheless, contemplated that depending on the material used in casting the induction passage structure, the actual size of the venturi and the size of the desired coined surface, it might be desirable to achieve the final coined surface area by two or more successive strikes of the tool coining surface 122 against the upstream surface portion of the venturi. As already indicated, the contour of tool coining surface 122 may be any desired configuration as, for example, one closely conforming to and employable for coining an upstream surface area as in portion 28 of FIG. 3. In any event, upon completion of such a coining operation, the induction passage structure 10 will have been completed with the flashing 26 of FIGS. 2 and 3 having been removed (as at a throat location 16 thereof) and an annular upstream coined surface will be formed as diagrammatically depicted by the crossed portion 140 of FIGS. 1, 2 and 3.

It should be apparent that various modifications and other embodiments of the invention are possible and that the practice of the invention is not limited to the precise structure, apparatus and/or methods disclosed herein.

Although only preferred embodiments of the invention have been disclosed and described, it is apparent that other embodiments and modifications of the invention are possible within the scope of the appended claims.

What is claimed is:

1. A method of assuring close conformance between the calculated volume rate of flow and the actual volume rate of flow of fluid through the throat of a metal venturi structure having generally converging venturi surface means upstream of and leading to said throat, comprising the steps of employing single tool means to first cut said throat to a precise size and configuration and then without withdrawing said single tool means from said precisely cut throat moving said single tool means toward said converging venturi surface means upstream of said precisely cut throat and with said single tool means coining said converging venturi surface means immediately upstream of said precisely cut throat so that the resulting coined surface is of an area less than the area of the entire said converging venturi surface means.

* * * * *